Dec. 13, 1966   M. A. PERL   3,291,036
RESISTANCE HEATING COOKING DEVICE
Filed March 17, 1965
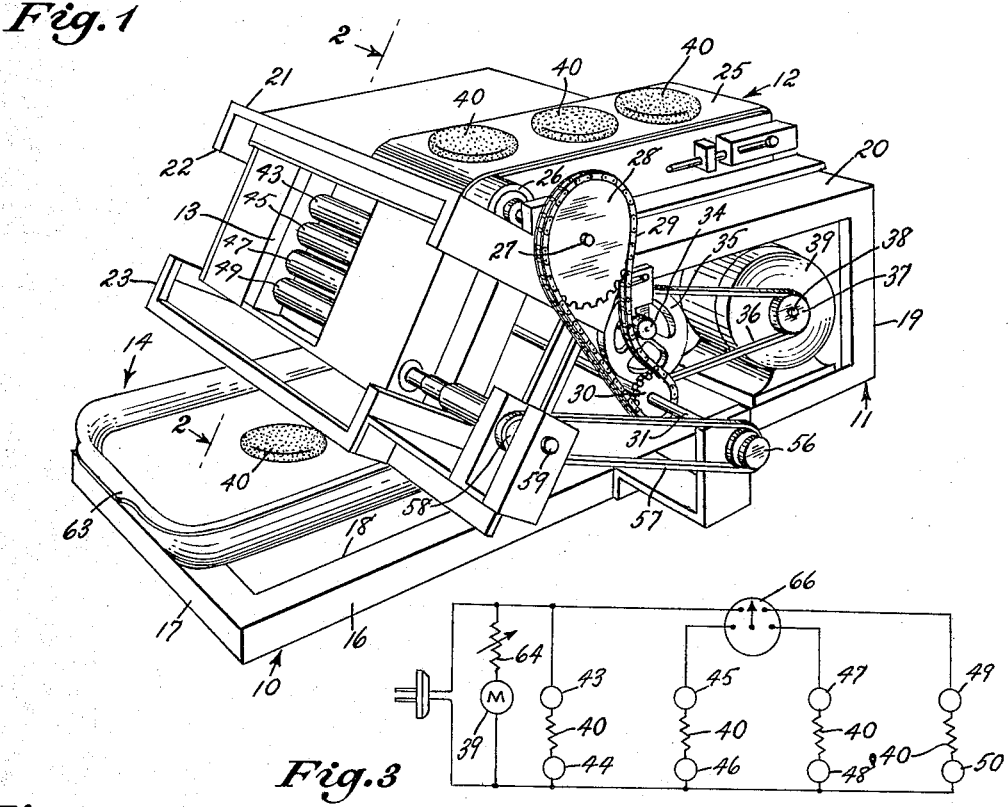
Fig.1
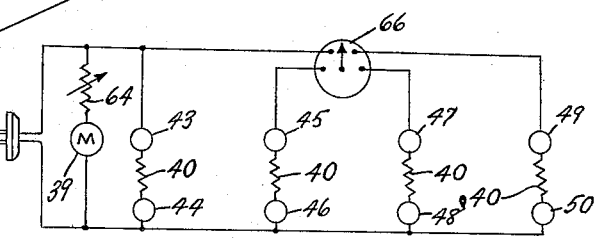
Fig.3
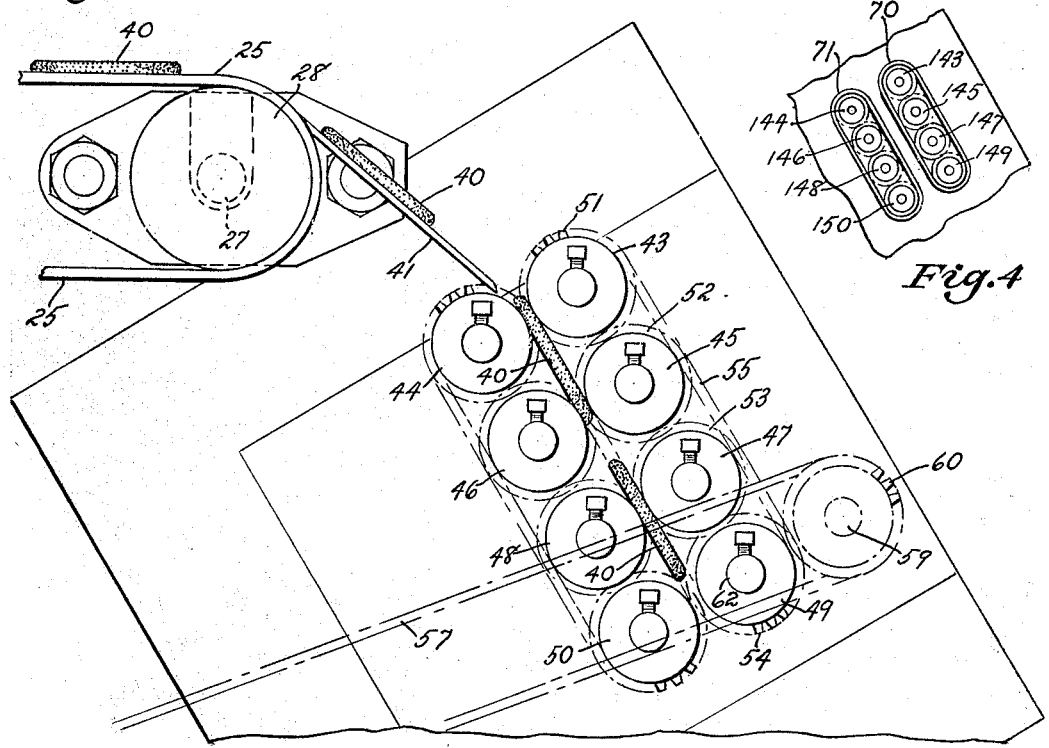
Fig.2
Fig.4

United States Patent Office 3,291,036
Patented Dec. 13, 1966

3,291,036
RESISTANCE HEATING COOKING DEVICE
Murray A. Perl, New London, Conn., assignor to International Food Machine Corp., New London, Conn., a corporation of Connecticut
Filed Mar. 17, 1965, Ser. No. 440,372
1 Claim. (Cl. 99—358)

This invention relates generally to the field of resistance cooking, that is to say cooking in which an electrical current is passed directly through the food being cooked to complete a circuit, the resistance to the passage of electricity through the food causing heat sufficient to cook the food in a relatively short period of time.

In the prior art, the principal problem which has been encountered has been the lack of provision for controlling the degree of cooking. The actual resistance to the passage provided by the article of food being cooked in relatively low, with a consequent high flow of current, so that, in the case of a small hamburger, complete cooking may be effected in a matter of a few seconds. In such case, the meat becomes excessively dried, with accompanying deterioration in appearance and flavor. Articles such as frankfurters are conveniently cooked by placing an electrode at each end of the frankfurter, and as the current must travel the entire length of the frankfurter, it is more readily controlled. However, in the case of a generally circular-shaped flat hamburger, the only feasible way to effect complete cooking has been to place the hamburger between a pair of flat plates, so that current will flow through all portions of the hamburger simultaneously. This provides such a wide area for the passage of current that control of the degree of cooking is almost impossible.

It is therefore among the principal objects of the present invention to provide an improved resistance heating device by means of which relatively flat articles of food, such as hamburgers, steaks and the like, may be cooked in a uniform manner to a desired degree.

Another object of the invention lies in the provision of an improved cooking device of the class described in which the cooking is accomplished at a relatively rapid rate, without accompanying drying of the meat, so that the previously well-established practice of pre-cooking the same to a degree less than that at which the food is fully cooked may be discontinued.

Yet another object of the invention lies in the provision of an improved cooking device possessed of the above advantages in which the cost of fabrication may be of a relatively low order, with consequent wide sale, distribution and use.

A feature of the invention lies in the fact that cooking may be accomplished in such manner that the exposed surfaces of the food are seared, while leaving the interior in rare condition.

These objects and features, as well as other incidental ends and advantages, will more fully appear in the progress of the following disclosure, and be pointed out in the appended claim.

In the drawing, to which reference will be made in the specification, similar reference characters have been employed to designate corresponding parts throughout the several views.

FIGURE 1 is a view in perspective of an embodiment of the invention.

FIGURE 2 is a vertical sectional view as seen from the plane 2—2 in FIGURE 1.

FIGURE 3 is an electrical schematic wiring diagram.

FIGURE 4 is a schematic view of an alternate form of the embodiment.

In accordance with the invention, the device, generally indicated by reference character 10, comprises broadly: a frame element 11, transport means 12, cooking means 13, and collecting means 14.

The frame element 11 is preferably of welded steel construction, including a bottom section 16, the section 16 including a forward member 17, and a pair of side members one of which is indicated by reference character 18. The forward member 17 interconnects with a rear member 19 and an upper wall member 20, the forward end of the upper wall member 20 supporting an angularly disposed frame 21. The frame 21 includes an upper channel member 22 and a lower channel member 23 supporting the cooking means 13.

The transport means 12 serves to advance seriatum individual articles of food to the cooking means 13. It includes an endless belt 25 having a forward driven roller 26 mounted on a shaft 27. The shaft 27 mounts a sprocket 28, a sprocket chain 29 being trained thereover, and over a lower sprocket 30 on a shaft 31. The shaft 31 also mounts a larger pulley (not shown) cooperating with a smaller pulley (also not shown) on a shaft 34. The shaft 34 also mounts a larger pulley 35 driven through a belt 36 from a small pulley 37 on an armature shaft 38 of an electric motor 39, whereby motion reduction is accomplished. Articles of food such as hamburgers 40 (see FIGURE 1) are placed upon the upper surface of the belt 25 to be advanced to a chute 41 communicating with the cooking means 13.

The cooking means 13 includes a first pair of rollers 43–44, a second pair of rollers 45–46, a third pair of rollers 47–48, and a fourth pair of rollers 49 and 50. The rollers, 43, 45, 47 and 49 are provided with sprockets 51, 52, 53 and 54, respectively, which are interconnected by a sprocket chain 55 so as to rotate simultaneously in the same angular direction. The rollers 44, 46, 48 and 50 may be free-turning, or interconnected in similar fashion as desired. As seen in FIGURE 1, motive power to the roller 49 is provided by a pulley 56 on the shaft 34, the pulley driving a belt 57 trained over a pulley 58 on a shaft 59, the shaft 59 having a gear 60 meshing with a gear (not shown) on the shaft 62 mounting the roller 49.

The collecting means 14 is disposed beneath the lowermost pair of rollers 49–50, and may take the form of a transport means (not shown) similar to the transport means 12, or may simply be a collecting pan 63 which will simultaneously catch both the cooked products and the juices and melted fats liberated during the cooking operation.

Referring to FIGURE 3 in the drawing, it will be observed that the motor 39 is connected to a source of electrical energy through a variable resistor 64, so that the speed of the rollers 43–50 may be adjusted as desired. Each of the pairs of rollers 43–44, 45–46, 47–48 and 49–50 are wired in such manner as to form an open circuit with the source of electrical potential, the circuit being closed by the passage of the hamburgers 40 or other articles of food passing between the interstice 65 between each pair of rollers. By means of a gang-type switch 66, one, two, three or four pairs of rollers may be placed in open circuit condition, depending upon the desired degree of cooking to be accomplished.

From a consideration of FIGURE 2, it will be observed that each pair of rollers forms a theoretical line of contact with the article of food as the same passes through the interstice. Where the articles is of initial thickness slightly greater than the width of the interstice, the same will be flattened and this line contact is enlarged slightly. However, at no time is the entire surface of the article being cooked in contact with any one pair of rollers, so that the path of current flow is materially reduced as contrasted with prior art plate-type devices, thereby preventing excessive flow of current and corresponding overcooking.

The degree of cooking may be adjusted in either of two ways, namely by adjusting the speed of rotation of the pairs of rollers, from which it follows that the amount of time during which current may flow through any given portion of the article of food being cooked is varied, and by disconnecting one or more pairs of rollers from open circuit relationship with respect to the source of electrical energy, so that cooking is accomplished only at certain of the rollers rather than all. Where a searing effect is desired, that is to say where cooking is to be accomplished at or near the surface, a heated roller such as Nichrome is used, whereas thorough cooking through the entire mass of the food is accomplished by relatively slow rotation, the degree of ultimate cooking accomplished being determined by the number of rollers which are in open circuit relationship and their speed of rotation.

In the alternate form shown in FIGURE 4, parts corresponding to those of the principal form have been designated by similar reference characters with the additional prefix "1."

In this form, the roller 143, 145, 147 and 149 are engaged by a continuous endless belt 171 of conductive material disposed in tangential relation to cooperate with a similar belt 170 on the rollers 144, 146, 148 and 150. The belts 170–171 permit a greater area over which current will flow during the passage of food therebetween, and this greater area permits faster cooking, where required, than the principal form of the embodiment.

I wish it to be understood that I do not consider the invention limited to the precise details of structure shown and set forth in this specification, for obvious modifications will occur to those skilled in the art to which the invention pertains.

I claim:

Means for cooking generally planar articles by electrical resistance heating, comprising: a generally horizontally disposed transport means supporting and advancing uncooked articles to a position for cooking, said transport means including an endless belt and chute means communicating between said belt and a cooking means, said chute means being disposed at an angle to the horizontally disposed belt means, said cooking means including opposed electrically conductive rollers defining a generally planar interstice disposed at an angle with respect to the plane of movement of uncooked articles on said transport means wherein said rollers are connected in series to a source of electrical potential and having a normally open circuit closed by the entrance of food into said interstice to provide electrical communication between said rollers, collecting means disposed beneath said cooking means for receiving articles in cooked condition from said cooking means, and a single prime mover means for simultaneously advancing said transport and cooking means in synchronism.

References Cited by the Examiner

UNITED STATES PATENTS

| | | | |
|---|---|---|---|
| 1,900,573 | 3/1933 | McArthur | 219—10.71 |
| 2,226,036 | 12/1940 | Watson | 99—358 |
| 2,243,492 | 5/1941 | Wilson | 99—373 X |
| 2,243,993 | 6/1941 | Watson | 99—358 |
| 2,575,426 | 11/1951 | Parnell | 99—443 |
| 2,630,519 | 3/1953 | Gard | 219—10.71 X |
| 2,685,833 | 8/1954 | Hagopian. | |
| 2,697,773 | 12/1954 | Gordon | 219—10.69 |
| 3,223,053 | 12/1965 | Jimenez et al. | 99—443 |

FOREIGN PATENTS 845,082   8/1952   Germany.

WALTER A. SCHEEL, *Primary Examiner.*

BILLY J. WILHITE, *Examiner.*